(12) United States Patent
Abernethy et al.

(10) Patent No.: US 10,262,763 B2
(45) Date of Patent: Apr. 16, 2019

(54) SYSTEMS, DEVICES, AND/OR METHODS FOR MANAGING RADIATION SHIELDING

(71) Applicant: Radium Incorporated, Waynesboro, VA (US)

(72) Inventors: Alfred Campbell Abernethy, Waynesboro, VA (US); Jayeesh Bakshi, Madison, WI (US)

(*) Notice: Subject to any disclaimer, the term of this patent is extended or adjusted under 35 U.S.C. 154(b) by 0 days.

(21) Appl. No.: 15/709,244

(22) Filed: Sep. 19, 2017

(65) Prior Publication Data

US 2018/0082760 A1   Mar. 22, 2018

Related U.S. Application Data

(60) Provisional application No. 62/396,752, filed on Sep. 19, 2016.

(51) Int. Cl.

| | | |
|---|---|---|
| *G21F 1/00* | (2006.01) | |
| *G21F 1/02* | (2006.01) | |
| G21F 3/02 | (2006.01) | |
| G21F 7/04 | (2006.01) | |
| G21F 7/03 | (2006.01) | |
| C01G 41/00 | (2006.01) | |
| G21F 3/00 | (2006.01) | |

(52) U.S. Cl.
CPC .......... *G21F 1/023* (2013.01); *C01G 41/00* (2013.01); *G21F 3/00* (2013.01); *G21F 3/02* (2013.01); *G21F 7/03* (2013.01); *G21F 7/04* (2013.01)

(58) Field of Classification Search
CPC ... G21F 1/023; G21F 3/00; G21F 3/02; G21F 7/03; G21F 7/04; C01G 41/00

USPC .................................. 250/515.1, 517.1, 526
See application file for complete search history.

(56) References Cited

U.S. PATENT DOCUMENTS

| | | | | | |
|---|---|---|---|---|---|
| 4,447,734 | A | * | 5/1984 | Kusumegi | ................. G21F 7/03 250/515.1 |
| 4,557,718 | A | * | 12/1985 | Kamps | ...................... B03B 5/32 209/173 |
| 4,557,924 | A | * | 12/1985 | Kim | ....................... C01G 41/00 423/594.13 |
| 4,626,424 | A | * | 12/1986 | Kim | ....................... C01G 41/00 23/300 |
| 5,328,035 | A | * | 7/1994 | Duyvesteyn | ............. B01J 23/04 209/173 |
| 5,632,824 | A | * | 5/1997 | Grenthe | ................. C01G 51/00 148/237 |
| 5,753,582 | A | * | 5/1998 | Garcin | ............... B01D 53/9418 502/305 |

(Continued)

*Primary Examiner* — Wyatt A Stoffa
(74) *Attorney, Agent, or Firm* — Dale Jensen, PLC; Dale Jensen (57) ABSTRACT

Certain exemplary embodiments can provide a system comprising a substantially transparent radiation shield, which comprises transparent ammonium metatungstate. The transparent ammonium metatungstate can have a density of greater than 1.5 gram/(cubic centimeter). The substantially transparent radiation shield can be installed on tanks and/or pressure vessels, used as a transparent radiation shield in medical shielding/devices, used as windows in glove boxes, and any application where effective radiation shielding is needed with transparency. The substantially transparent radiation shield can be used in one or more articles worn by a human.

20 Claims, 7 Drawing Sheets
(3 of 7 Drawing Sheet(s) Filed in Color)

1000

(56) References Cited

U.S. PATENT DOCUMENTS

| | | | | |
|---|---|---|---|---|
| 5,772,978 A * | 6/1998 | Bailey | ............... | C01G 41/00 |
| | | | | 423/606 |
| 5,911,965 A * | 6/1999 | Bailey | ............... | C01G 41/00 |
| | | | | 423/598 |
| 7,851,401 B2 * | 12/2010 | Figueras | ............ | B01J 21/063 |
| | | | | 208/208 R |
| 8,435,467 B2 * | 5/2013 | Luo | ............ | C01G 41/00 |
| | | | | 423/56 |
| 8,435,483 B2 * | 5/2013 | White | ............ | C01G 41/003 |
| | | | | 423/593.1 |
| 8,853,314 B2 * | 10/2014 | Mamak | ............ | C09D 7/68 |
| | | | | 524/413 |
| 2007/0075277 A1 * | 4/2007 | Smith | ............ | G21F 1/125 |
| | | | | 250/515.1 |
| 2008/0292293 A1 * | 11/2008 | Song | ............ | A61H 33/063 |
| | | | | 392/347 |
| 2010/0040532 A1 * | 2/2010 | White | ............ | C01G 41/003 |
| | | | | 423/594.13 |
| 2010/0297206 A1 * | 11/2010 | Kim | ............ | A01N 59/10 |
| | | | | 424/409 |
| 2011/0002840 A1 * | 1/2011 | White | ............ | C01G 41/003 |
| | | | | 423/594.13 |
| 2012/0141359 A1 * | 6/2012 | Luo | ............ | C01G 41/00 |
| | | | | 423/594.13 |
| 2012/0263661 A1 * | 10/2012 | Grune | ............ | A61K 8/044 |
| | | | | 424/59 |
| 2014/0225039 A1 * | 8/2014 | Chiang | ............ | B05D 1/02 |
| | | | | 252/478 |
| 2015/0248941 A1 * | 9/2015 | Thibeault | ............ | G21F 1/10 |
| | | | | 252/478 |

* cited by examiner

SYSTEMS, DEVICES, AND/OR METHODS FOR MANAGING RADIATION SHIELDING

CROSS-REFERENCES TO RELATED APPLICATIONS

This application claims priority to, and incorporates by reference herein in its entirety, U.S. Provisional Patent Application Ser. No. 62/396,752, filed Sep. 19, 2016.

BRIEF DESCRIPTION OF THE DRAWINGS

The patent or application file contains at least one drawing executed in color. Copies of this patent or patent application publication with color drawing(s) will be provided by the Office upon request and payment of the necessary fee. FIGS. 7a-7I are executed in color. A wide variety of potential practical and useful embodiments will be more readily understood through the following detailed description of certain exemplary embodiments, with reference to the accompanying exemplary drawings in which:

FIG. 2 is a representation of electron behavior of a system 2000, which comprises a tungsten atom in proximity to a water molecule;

DETAILED DESCRIPTION

Certain exemplary embodiments can provide a system comprising a substantially transparent radiation shield, which comprises transparent ammonium metatungstate. The transparent ammonium metatungstate can have a density of greater than 1 gram/(cubic centimeter). The substantially transparent radiation shield can be installed on tanks and/or pressure vessels, used as a transparent radiation shield in medical shielding/devices, used as windows in glove boxes, and any application where effective radiation shielding is needed with transparency. The substantially transparent radiation shield can be used in one or more articles worn by a human.

Materials such as tungsten, lead, concrete, stainless steel and iron are used for most radiation shielding. These dense metals work well for shielding radiation but they are thick, heavy, and in lead's case, toxic. They come in forms such as bricks, sheets, plates, and lead wool sown in blankets and are used in temporary and substantially permanent radiation shields; none of which are transparent. Water is also used for shielding nuclear fuel in certain circumstances. Many feet of water can be used to shield personnel from a high radiation source, which reduces working space drastically.

A dense liquid housed in containers can be used for shielding radiation such as gamma rays, neutrons, and other forms of radiation. The liquid is a transparent formulation of Ammonium Metatungstate ("AMT"). AMT can be used in other applications in the geology and oil industry. We have developed a high density formulation of AMT for use in radiation shielding products housed in acrylics/polycarbonates to take advantage of the light weight, shielding capabilities, and the transparent characteristics of our AMT fluid.

High purity water, AMT, nitric acid ($HNO_3$) and ammonia water were the materials used to formulate our AMT solution. There was a process to select a water-soluble, non-toxic, heavy element powder and mixing it in a solvent to attain high contribution of the heavy element. To create a fine particle AMT product for our solution, there were many technical criteria that the product had to meet. Besides the performance, material safety was an important criterion in case of material spillage occurred. The Hazardous Materials Identification System (HMIS) and National Fire Protection Association ratings were considered. Water soluble compounds such as sodium tungstate, lead nitrate, lead sulfate, silicotungstic acid, magnesium tritungstate, etc. were considered but none of them fulfilled the criteria of shielding performance and safety. Our AMT solution is reasonably safe to handle and can be washed off with water and soap if it spills on the floor or on hands.

We desired to find an alternative to lead and tungsten (i.e., wolfram) as the main candidate for shielding application. Having a liquid shield has advantages and for effective shielding, a sufficient number of tungsten atoms can be utilized. The reactions and bonding of tungsten with alkalis, alkaline earth elements, transition elements, rare earth metals, organic solvents and acidic solutions was studied. This research was companioned with analysis of diffusion of gases into tungsten, and thermodynamic stability of tungsten compounds.

Further research into formation of long chain tungsten compounds revealed that long chain tungstates are seen in the form of paratungstates ($[HW_6O_{20}(OH)_2]^{5-}$, or as $[HW_6O_{21}]^{5-}$), monotungstates with octahedral structure ($[WO_2(OH)_4]^{2-}$), tungsten monomers such as $WOBr_4$ and polycondensates of tungsten leading to the Keggin structure $[H_2W_{12}O_{40}]^{6-}$. Research led to this selection with twelve tungsten atoms in the anion, giving tungsten approximately 77.45% contribution in the anion.

Figure 1:
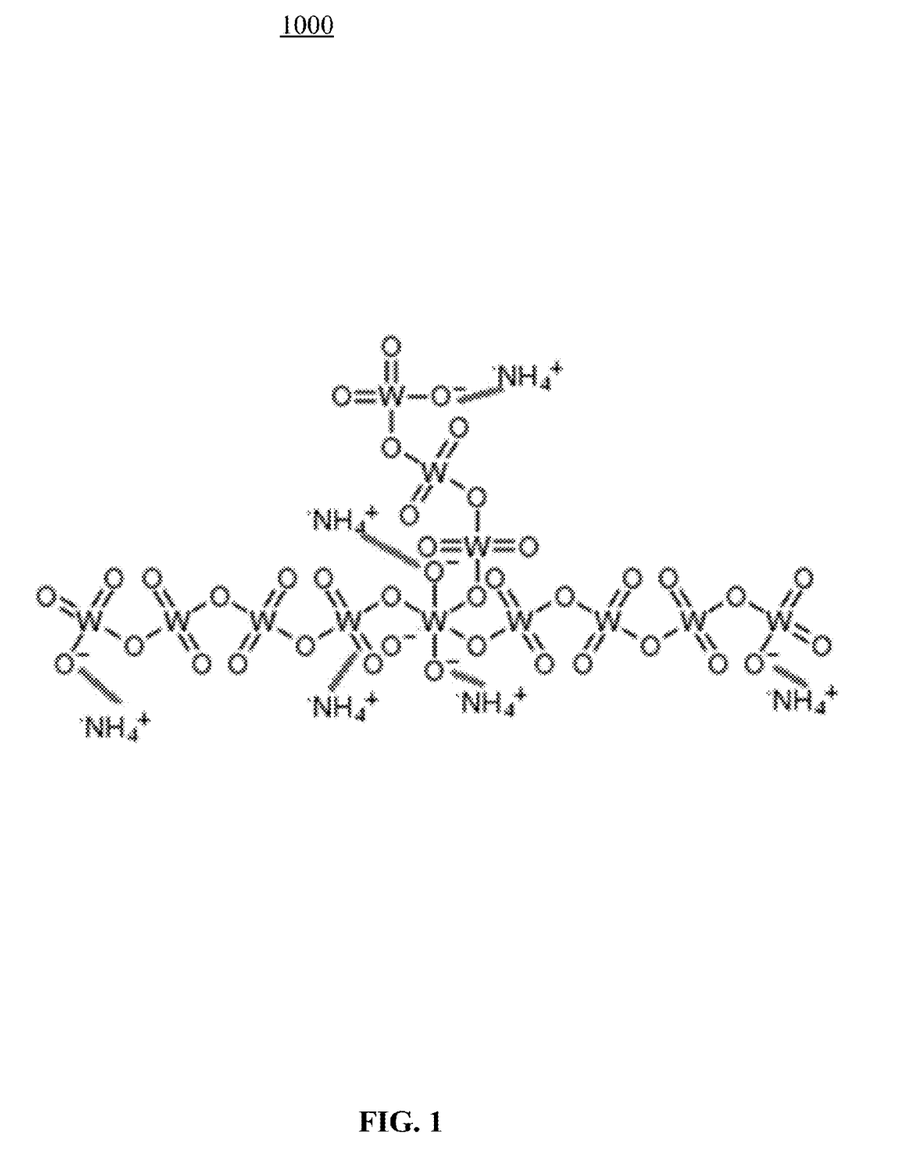
FIG. 1 is a representation of a structure of ammonium metatungstate 1000.

We conducted research that led to demonstrate the combined effectiveness of AMT in subjects of safety, tungsten concentration and solubility in water. The AMT salt has a Keggin structure, which is shown in FIG. 1. In many ways it replicates a long chain hydrocarbon, much like the buckminsterfullerene structure of carbon-60.

To evaluate the solubility of anhydrous AMT in a solvent, we studied bond formation, bond energy, and its stability.

The electron configuration of tungsten is 1s2 2s2 2p63s2 3p6 4s2 3d10 4p6 5s2 4d10 5p6 6s2 4f14 5d4. The 5d shell has space to accept electrons from a donor. Among the elements tungsten bonds with, oxygen bonds very well, since it has an electron pair that can be donated to form a bond. Among the solvents researched with oxygen in liquid form, water ($H_2O$) was the most stable. Oxygen from water donated an electron to the 5d shell of tungsten and formed a coordination bond.

FIG. 2 is a representation of electron behavior of a system 2000, which comprises a tungsten atom in proximity to a water molecule.

The $5^{th}$ orbital can accommodate 32 electrons and naturally tungsten has 10 electrons. Hence, the $5^{th}$ orbital has capacity for 22 more electrons and oxygen from the solvent we used, water, formed a coordination bond with tungsten, which is represented in a model shown in FIG. 2. This bonding process between ammonium metatungstate and water makes it a candidate for creating a liquid shield.

The molecular mass of AMT is approximately 2958. Careful deliberation was utilized in selecting the AMT. The AMT used to create the AMT solution was substantially anhydrous; research demonstrated that solubility of AMT in water could be different and certain exemplary embodiments utilize substantially anhydrous AMT.

Preparation of Solution

The raw materials utilized were high purity water, AMT, $HNO_3$, and ammonia water.

Certain exemplary embodiments provide an ammonium metatungstate solution with a density of greater than approximately 1.5 grams/(cubic centimeter), wherein the ammonium metatungstate solution is filtered to remove particles greater than approximately 15 microns in size. Certain exemplary ammonium metatungstate solutions when analyzed via Raman spectroscopy yield a spectrum that has peaks at approximately 884 $cm^{-1}$, approximately 923 $cm^{-1}$, and approximately 972 $cm^{-1}$. The ammonium metatungstate solution can comprise greater than 30% tungsten by weight. The ammonium metatungstate solution can have a gamma ray mass attenuation coefficient of at least 0.06 (square centimeters)/gram. The ammonium metatungstate solution can remain substantially transparent at distances of at least one foot.

With density and addition of AMT powder, certain exemplary embodiments can utilize different (e.g., lower) mixing ratios than those disclosed in exemplary embodiments herein, such embodiments can have correspondingly different (e.g., lower) densities. Certain exemplary embodiments can utilize higher mixing ratios than exemplary embodiments disclosed herein, which can result in a density higher than 2.35 when a system is pressurized while mixing.

Figure 3:
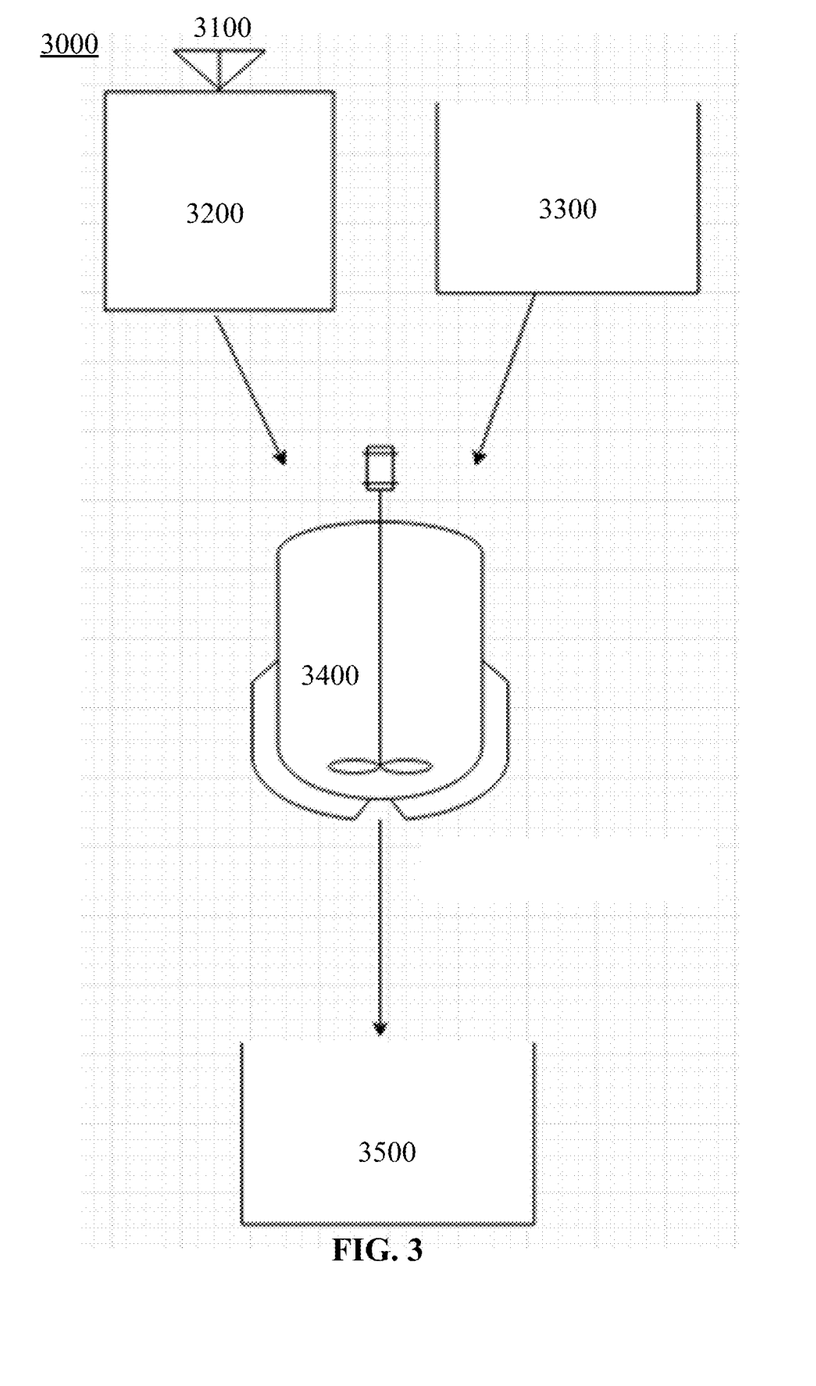
FIG. 3 is a block diagram of an exemplary embodiment of a system 3000.

An exemplary manufacturing process for our stable AMT solution is shown in FIG. 3. FIG. 3 is a block diagram of an exemplary embodiment of a system 3000. An ammonium metatungstate feed 3100 is placed in a feed vessel 3200. Very pure water is placed in water vessel 3300. The ammonium metatungstate and very pure water are fed to mixing vessel 3400 in predetermined proportions selected to result in desired stable AMT solution properties. The stable AMT solution is conveyed to storage vessel 3500.

The exemplary manufacturing process that was used has produced a stable AMT solution with a solubility of approximately 2.2 grams of AMT per approximately 1 ml of water.

Figure 4:
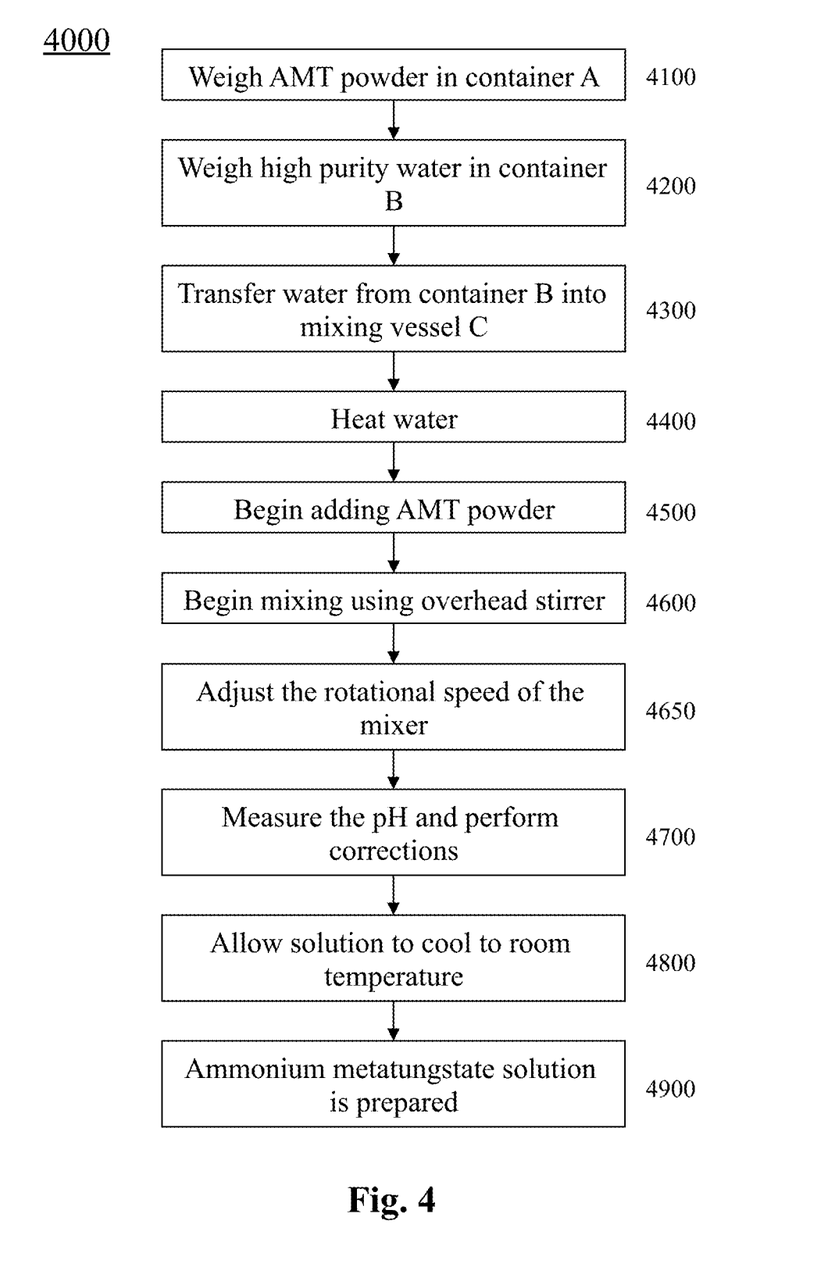
FIG. 4 is a flowchart of an exemplary embodiment of a method 4000.

FIG. 4 is a flowchart of an exemplary embodiment of a batch method 4000 for making an exemplary ammonia metatungstate solution. At activity 4100, ammonium metatungstate powder is weighed into a first container. At activity 4200, high purity water is weighed into a second container. At activity 4300, the water is transferred to a third container. At activity 4400, the water is heated, such as to approximately 33° C. Certain exemplary embodiments comprise adjusting temperature in a mixing vessel such as to between 14° C. and 99° C.

At activity 4500, the ammonium metatungstate powder is added to the third container. The ammonium metatungstate powder can be added to the ammonium metatungstate solution in an amount greater than 1.9 grams per milliliter of water. The ammonium metatungstate powder can be added in installments to a mixing vessel comprising water. The ammonium metatungstate powder can be mixed with the water between installments. The ammonium metatungstate powder can be mixed in a mixing vessel for a predetermined time period.

At activity 4600, a stirrer in the third container is energized and begins stirring the solution. At activity 4650, a rotational speed of a mixer in a mixing vessel can be adjusted. At activity 4700, pH is measured in the third container and corrections are made to the pH. Certain exemplary embodiments comprise adjusting pH in a mixing vessel comprising ammonium metatungstate powder and water. Certain exemplary embodiments comprise adjusting pH in a mixing vessel comprising ammonium metatungstate powder and water to a level between 2.0 and 4.5. Certain exemplary embodiments comprise adding nitric acid to a mixing vessel comprising ammonium metatungstate powder and water. At activity 4800, the solution is cooled to room temperature.

At activity 4900, the solution is prepared for use and can be transferred to a fourth container for use. In certain exemplary embodiments, the transfer to the fourth container can be substantially without exposure of the solution to air. Certain exemplary embodiments comprise causing transfer of the ammonium metatungstate solution from the third container to the fourth container substantially without exposing the ammonium metatungstate solution to air. Certain exemplary embodiments provide preparing an ammonium metatungstate solution with a density of approximately 2.35 grams/(cubic centimeter).

Figure 5:
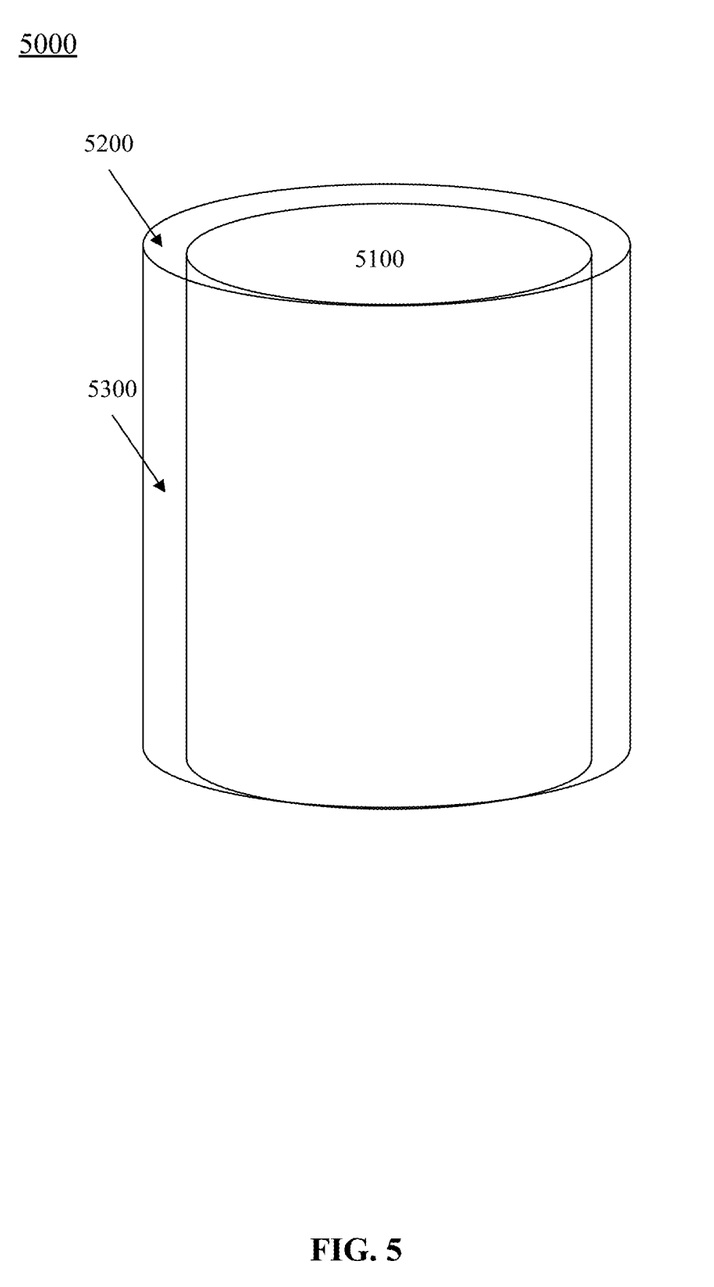
FIG. 5 is a block diagram of an exemplary embodiment of a system 5000.

FIG. 5 is a block diagram of an exemplary embodiment of a system 5000. Certain exemplary embodiments provide an at least partially transparent radiation shield 5200 comprising transparent ammonium metatungstate solution 5300. Transparent ammonium metatungstate solution 5300 has a density of greater than 1.5 grams/(cubic centimeter). Transparent radiation shield 5200 can be installed on mechanical equipment, tanks, transparent radiation shields is worn by humans, mounted on rockets, submarines, ships, medical isotope production facilities, in hospitals, radiation detectors, as camera housings, and or particle accelerators, etc. Certain exemplary embodiments provide a transparent shield installed inside a wall used as a window. Certain exemplary embodiments can be installed on mobile equipment as a rolling shield.

Factors for a stable Ammonium Metatungstate Solution

Rate of addition of AMT Powder—We determined that the AMT powder should added in installments and not all at once. It was determined that sufficient time should be utilized for mixing and bond formation for a small batch of approximately one gallon. In an exemplary embodiment, we found that adding approximately half of the AMT and mixing for approximately twenty to thirty minutes resulted in acceptable bond formation. In that embodiment, the second half of the AMT was added and mixed for approximately sixty minutes.

Certain parameters were monitored during mixing. For example, pH, clarity, and/or liquid volume, etc. can be used to determine that a stable solution has been created. Mixing time and conditions may be scaled and altered according to size of batch keeping the dimensionless numbers for the batches substantially similar. We also determined that more AMT than approximately 2.2 grams per milliliter water is added in aforementioned mixing conditions, the solution can proceed towards super saturation. It seemed that the dissolution process was complete, but as soon as the solution cooled down the crystals began to appear.

Temperature—The temperature of the water (solvent) and solution during mixing process was important. If the mixing was done at room temperature, the Gibbs free energy of the system remained negative for a smaller time and the reaction or bonding for AMT and water reached equilibrium at a lower concentration. Increasing the temperature of water increased the entropy and larger negativity of Gibbs free energy in the system, since increasing the temperature increased the partial entropy of individual species of AMT and water. A larger negativity of Gibbs free energy gave a greater bond formation between AMT and water as the solution reached equilibrium. If we increased the temperature too much, the internal energy of the system became high enough to break the bonds formed between the water and AMT powder. These bonds were not ionic or pure covalent bonds, but coordination bonds formed on donation of lone electron pairs by oxygen. Increasing temperature broke the water bonds and evaporated the water, recrystallizing the AMT powder.

Stability and pH—During the mixing process, situations may occur that the pH will increase or decrease on addition of AMT in water. During the mixing process, OH— ions or H+ ions can be released which contribute to the acidity or basicity of the AMT solution. We discovered that to achieve solubility of approximately 2.2 grams per milliliter water or approximately 2.2 kilograms AMT in approximately 1 liter water, the pH for a stable solution was approximately 2.8. In case the pH deviated, we had an approximate 1:1 $HNO_3$ solution diluted in approximately 20 milliliters of water and ammonia water ($NH_4OH$) to stabilize acidity and basicity respectively.

Mixing speed—The agitation of velocity or rotations per minute (RPM) is also a factor to be monitored and controlled. Increasing the mixing rate increases the turbulence of the system. This is turn increases the internal energy of the system, which will break coordination the bonds, formed between water and AMT. Combining this turbulence with heat added to the system, can evaporate water from the solution. Once again it may seem that dissolution has taken place, but as soon as mixing and heating stops crystals will appear.

By controlling the parameters of Temperature, Mixing Rate, Solubility, pH, rate of addition of Ammonium Metatungstate powder, we have successfully increased the solubility of AMT powder by 46.667% compared to certain others. This increased solubility has resulted in the invention of Ammonium Metatungstate solution with a density of approximately 2.35 grams/($cm^3$), which is approximately 235% denser and heavier than water.

Figure 6:
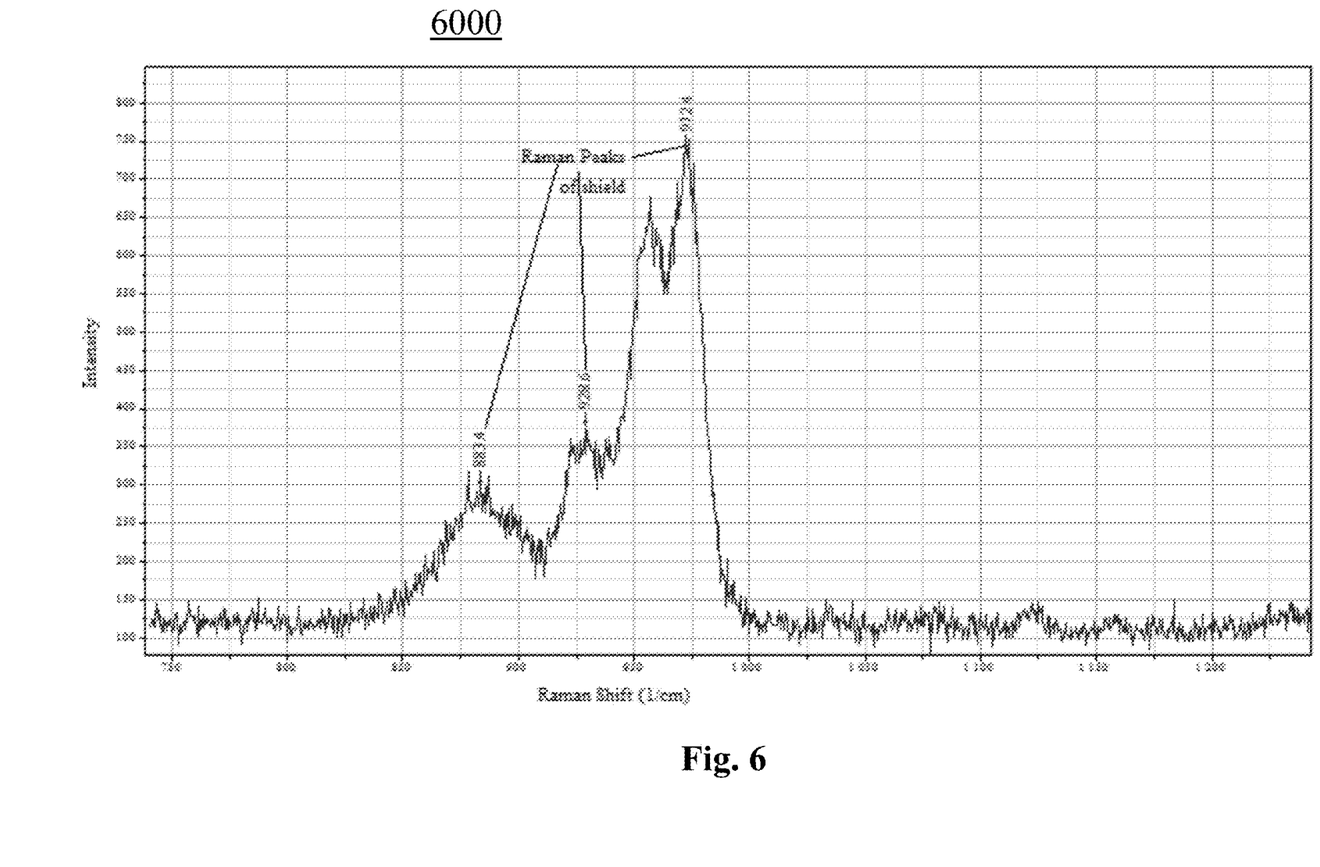
FIG. 6 is an exemplary Raman Spectra 5000 of exemplary Ammonium Metatungstate signature of long chain Tungsten and Oxygen bond.

FIG. 6 is an exemplary Raman Spectra 6000 of exemplary Ammonium Metatungstate. Certain exemplary embodiments provide an ammonium metatungstate solution with a density of greater than 1.5 grams/(cubic centimeter), wherein the ammonium metatungstate solution is filtered to remove particles greater than 15 microns in size. Raman spectroscopy of the ammonium metatungstate solution has peaks at approximately 884 $cm^{-1}$, approximately 923 $cm^{-1}$, and approximately 972 $cm^{-1}$. The ammonium metatungstate solution comprises greater than 50% tungsten by weight. The ammonium metatungstate solution has a gamma ray mass attenuation coefficient of at least 0.06 (square centimeters)/gram and remains transparent at distances of at least one foot Testing We performed a detailed study covering chemical bond formation, ionizing radiation and interaction with matter, chemical reaction engineering to our ammonium metatungstate solution.

To verify the solution's tungsten content per unit volume of AMT solution, we performed inductively coupled plasma atomic emission spectroscopy. This spectroscopic technique sprays a known volume of the AMT solution into high temperature plasma. The constituents of our solution are engulfed by the plasma, burn and emit light. The detectors in the machine report the intensity and wavelength emitted from the light rays, which are used to calculate the concentration of constituent elements in the form milligrams per milliliter. Results from this experiment showed that our invented solution had approximately 53.15% Tungsten.

Raman spectroscopy was also performed to verify the formation of ammonium metatungstate solution. Raman peaks were observed as expected at approximately 884 cm-1, approximately 923 cm-1 and approximately 972 cm-1. This was an additional validation step. In case the pH and temperature conditions would not have been maintained as mentioned the peaks would not have been at these wave numbers. Raman spectroscopy is commonly known as the fingerprint of a compound and our fingerprints were of the ammonium metatungstate solution. Any deviation or other kind of bond formed would have been reported by their Raman spectra.

We verified that we manufactured the ammonium metatungstate solution, with a tungsten content of approximately 53.15% by weight and that it was a stable solution.

Radiation Testing

An irradiation test was performed on our AMT solution using a cobalt-60 source and the A.N.S.I/H/P.S. N13.11 standard; the method which is used to calibrate dosimeters used in medical facilities and nuclear power plants. The test was performed with different thicknesses of our developed liquid AMT shield. Cobalt-60 is a very strong source of gamma rays and emits photons at approximately 1.3325 MeV and approximately 1.1732 MeV. This test was performed to get the half value layer of an exemplary ammonium metatungstate solution and compare it with lead.

Half value layer ("HVL") is defined as the width or thickness of a material utilized to reduce the air kerma or dose of x-rays or gamma ray to half its original value.

The results from our testing are shown in the table below.

| Parameter | Lead | Aluminum | Ammonium Metatungstate Solution |
|---|---|---|---|
| Density | $11.34 \frac{grams}{cm^3}$ | $2.7 \frac{grams}{cm^3}$ | $2.35 \frac{grams}{cm^3}$ |
| Half Value Layer | 0.58 inches (14.73 mm) | 1.843 inches (46.83 mm) | 1.50 inches (38.1 mm) |

-continued

| Parameter | Lead | Aluminum | Ammonium Metatungstate Solution |
|---|---|---|---|
| Mass Attenuation Coefficient (at Co-60 gamma energy) | $0.0569 \frac{cm^2}{grams}$ | $0.0548 \frac{cm^2}{grams}$ | $0.0894 \frac{cm^2}{grams}$ |

As sown in the table above, our AMT solution:
1) Has a mass attenuation coefficient approximately 38.70% better than Aluminum and approximately 36.35% better than lead.
2) With a density of 2.35 grams/(cubic centimeter) will be 50% lighter than lead for equivalent reduction in radiation.

In most but not all applications, the AMT solution, which is the gamma shield, will be contained in a Polycarbonate or Cast Acrylic Housing with a thickness at least 0.125", which provides sufficient protection against Alpha and Beta particles.

AMT solution was also tested for its effectiveness against with neutrons of different energies. Against thermal neutrons, energies<0.05 eV, 1.5" thick AMT solution contained in a housing with 0.25" thick polycarbonate walls, reduction of thermal neutron flux and dose was reported to be at least 60%. Against fast neutrons of approximately 2.5 MeV energy, at least 3.75" of AMT solution and at least 2" polycarbonate, reduction neutron flux and dose was reported to be at least 50%.

Applications:

Radiation shielding applications across many industries including but not limited to nuclear power, medical, dental, radiography, space, and other industries where radiation is present.

We have developed transparent panels that can be filled with our AMT solution and can be used in temporary or permanent radiation shields. See FIG. 7 for examples.

We have developed shield doors for pressure vessel or tank openings where radiation is present inside. Workers can view through the shield to look inside these containers while being shielded from the radiation. These shield doors can be mounted on the man ways and rotate out of the way to allow access to the opening.

We have developed a transparent personal shielding panel to be placed in front of the worker to protect his whole body from the radiation but allow the worker to reach around the panel to complete his work activity while viewing the work area through our shield. This can be a supported panel on a pedestal/stand or a formed clear polycarbonate in any shape to accommodate the work location.

Because it is a liquid, it can be easily pumped from a shield container to another holding container when the shield is not utilized.

Figure 7A:
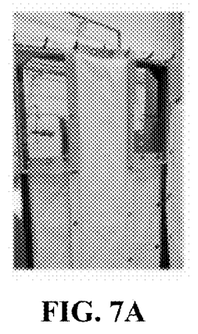
FIG. 7A is a photograph of our transparent Ammonium Metatungstate solution housed in window panels.

FIG. 7A is a photograph of our transparent Ammonium Metatungstate solution housed in window panels.

Figure 7B:
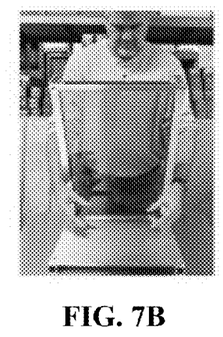
FIG. 7B is a photograph of our transparent Ammonium Metatungstate solution housed in a shielded work platform.

FIG. 7B is a photograph of our transparent Ammonium Metatungstate solution housed in a shielded work platform.

Figure 7C:
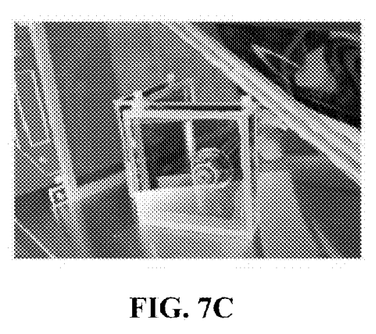
FIG. 7C is a photograph of our transparent Ammonium Metatungstate solution housed in shield panels, which make a glove box.

FIG. 7C is a photograph of our transparent Ammonium Metatungstate solution housed in shield panels, which make a glove box.

Figure 7D:
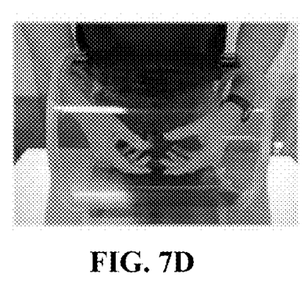
FIG. 7D is a photograph of our transparent Ammonium Metatungstate solution housed in a hollow shield cylinder.

FIG. 7D is a photograph of our transparent Ammonium Metatungstate solution housed in a hollow shield cylinder.

Figure 7E:
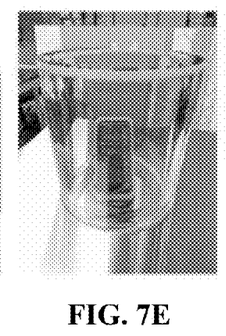
FIG. 7E is a photograph of our transparent Ammonium Metatungstate solution housed in a hollow shield cylinder.

FIG. 7E is a photograph of our transparent Ammonium Metatungstate solution housed in a hollow shield cylinder.

Figure 7F:
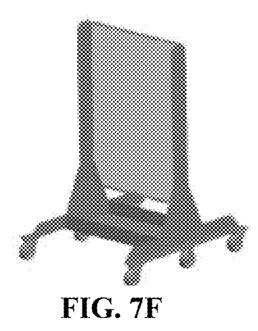
FIG. 7F is a photograph of our transparent Ammonium Metatungstate solution housed in a shielded rolling rack.

FIG. 7F is a photograph of our transparent Ammonium Metatungstate solution housed in a shielded rolling rack.

Figure 7G:
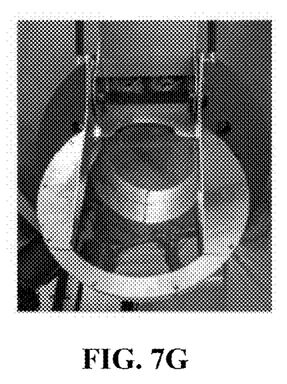
FIG. 7G is a photograph of our transparent Ammonium Metatungstate solution housed in a transparent shield door.

FIG. 7G is a photograph of our transparent Ammonium Metatungstate solution housed in a transparent shield door.

Figure 7H:
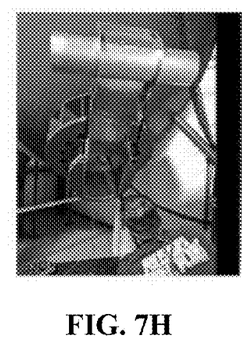
FIG. 7H is a photograph of our transparent Ammonium Metatungstate solution housed in a transparent shield door.

FIG. 7H is a photograph of our transparent Ammonium Metatungstate solution housed in a transparent shield door.

Figure 7I:
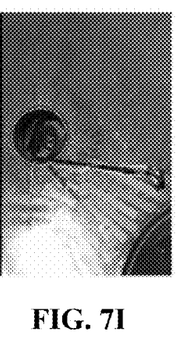
FIG. 7I is a photograph of our transparent Ammonium Metatungstate solution housed in a transparent shield door.

FIG. 7I is a photograph of our transparent Ammonium Metatungstate solution housed in a transparent shield door.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

add—to put something in with something else.

adjust—to change.

alpha particle—two protons and two neutrons bound together into a particle substantially identical to a helium nucleus.

amount—quantity.

and/or—either in conjunction with or in alternative to.

apparatus—an appliance or device for a particular purpose.

approximately—almost, but not completely, accurate or exact.

ammonium metatungstate—A chemical compound with a molecular formula of $(NH_4)_6H_2W_{12}O_{40} \cdot xH_2O$, a unit cell having orthorhombic structure.

associate—to join, connect together, and/or relate.

beta particle—a high-energy, high-speed electron or positron emitted in the radioactive decay of an atomic nucleus.

bremsstrahlung—electromagnetic radiation produced by the deceleration of a charged particle when deflected by another charged particle, typically an electron by an atomic nucleus.

can—is capable of, in at least some embodiments.

comprising—including but not limited to.

configure—to make suitable or fit for a specific use or situation.

constructed to—made to and/or designed to.

container—a device creating a partially or fully enclosed space that can be used to contain, store, and transport objects or materials.

convert—to transform, adapt, and/or change.

define—to establish the outline, form, or structure of.

density—a degree of compactness of a substance that is measured in mass per unit volume.

determine—to obtain, calculate, decide, deduce, and/or ascertain.

device—a machine, manufacture, and/or collection thereof.

effective barrier—a device and/or system that substantially prevents something moving past a particular interface.

fast neutron—a free neutron having a kinetic energy level of approximately 1 MeV (100 TJ/kg), hence a speed of at least 14,000 km/s.

gamma ray—electromagnetic radiation of the shortest wavelength and highest energy.

generate—to create, produce, give rise to, and/or bring into existence.

human—of or characteristic of people.

install—to place or fix (e.g., equipment or machinery) in position ready for use.

installments—added via a plurality of discrete dosages over time.

mass attenuation coefficient—a quantitative measure of a material characterizing how easily the material can be penetrated by a beam of ionizing radiation.

may—is allowed and/or permitted to, in at least some embodiments.

mechanical or industrial equipment—devices and/or systems comprising parts that transmit forces, motion, and energy one to another in a predetermined manner and used in an operation or activity.

medical equipment or facility—structures, devices and/or systems used to treat humans.

method—a process, procedure, and/or collection of related activities for accomplishing something.

mix—to blend ingredients together.

nitric acid—a chemical compound having a linear formula of $HNO_3$.

peak—a local or global maxima of an analytic spectra.

penetrate—to enter or pass through something.

pH—a numeric scale used to specify the acidity or basicity of an aqueous solution.

plurality—the state of being plural and/or more than one.

powder—fine solid particles.

predetermined—established in advance.

prepare—to make something by putting things together.

pressure vessel—a container constructed to hold substances at a pressure substantially different from the ambient pressure.

provide—to furnish, supply, give, and/or make available.

radiation shield—a device and/or system that comprises a material that is constructed to absorb ionizing radiation when placed between an ionizing radiation source (e.g., a nuclear reactor or other source of ionizing radiation) and a human to reduce a radiation level to a magnitude that is safe for human exposure.

Raman spectroscopy—a spectroscopic technique used to observe vibrational, rotational, and other low-frequency modes in a system. Raman spectroscopy is commonly used in chemistry to provide a structural fingerprint by which molecules can be identified.

receive—to get as a signal, take, acquire, and/or obtain.

repeatedly—again and again; repetitively.

request—to express a desire for and/or ask for.

rotational speed—angular velocity.

set—a related plurality.

solution—a liquid mixture in which the minor component (the solute) is substantially uniformly distributed within the major component (the solvent).

substantially—to a great extent or degree.

system—a collection of mechanisms, devices, machines, articles of manufacture, processes, data, and/or instructions, the collection designed to perform one or more specific functions.

tank—a container constructed to hold a substance.

temperature—a measure of kinetic energy of a substance.

thermal neutron—a free neutron with a kinetic energy of approximately 0.025 eV (about $4.0 \times 10^{-21}$ J or 2.4 MJ/kg, hence a speed of 2.2 km/s), which is the most probable energy at a temperature of 290 K (17° C. or 62° F.), the mode of the Maxwell-Boltzmann distribution for this temperature.

transfer—to move from one location to another.

temperature—a measure of kinetic energy of a substance.

time period—a discrete time interval.

transparent—allowing light to pass through so that objects behind can be seen by a human with reasonable visual acuity.

vessel—a receptacle that defines a hollow portion constructed to hold a liquid.

via—by way of and/or utilizing.

worn—placed on a body of.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a transparent radiation shield comprising a container holding a transparent ammonium metatungstate solution, the transparent ammonium metatungstate solution having a density of greater than 1.5 grams/(cubic centimeter).

2. The system of claim 1, wherein:
the transparent radiation shield is installed on mechanical or industrial equipment.

3. The system of claim 1, wherein:
the transparent radiation shield is installed on medical equipment or facility.

4. The system of claim 1, wherein:
the transparent radiation shield is wearable by a human.

5. A method comprising:
placing an ammonium metatungstate solution with a density of approximately 2.35 grams/(cubic centimeter) in a container of a transparent radiation shield.

6. The method of claim 5, wherein:
making the ammonium metatungstate solution by adding ammonium metatungstate powder in an amount greater than 1.5 grams per milliliter of water.

7. The method of claim 5, further comprising:
making the ammonium metatungstate solution by adding an ammonium metatungstate powder in installments to a mixing vessel comprising water; and
mixing the ammonium metatungstate powder with the water between installments.

8. The method of claim 5, further comprising:
making the ammonium metatungstate solution by mixing the ammonium metatungstate solution in a mixing vessel for a predetermined time period.

9. The method of claim 5, further comprising:
making the ammonium metatungstate solution by adjusting temperature in a mixing vessel.

10. The method of claim 5, further comprising:
making the ammonium metatungstate solution by adjusting a rotational speed of a mixer in a mixing vessel.

11. The method of claim 5, further comprising:
making the ammonium metatungstate solution by adjusting temperature in a mixing vessel to between 14° C. and 99° C.

12. The method of claim 5, further comprising:
making the ammonium metatungstate solution by adjusting pH in a mixing vessel comprising ammonium metatungstate powder and water.

13. The method of claim 5, further comprising:
making the ammonium metatungstate solution by adjusting pH in a mixing vessel comprising ammonium metatungstate powder and water to a level between 2.0 and 4.5.

14. The method of claim 5, further comprising:
making the ammonium metatungstate solution by adding nitric acid to a mixing vessel comprising ammonium metatungstate powder and water.

15. The method of claim 5, further comprising:
making the ammonium metatungstate solution by causing transfer of the ammonium metatungstate solution from a first container to a second container substantially without exposing the ammonium metatungstate solution to air.

16. A radiation shield comprising a container holding an ammonium metatungstate solution with a density of greater than 1.5 grams/(cubic centimeter), wherein the ammonium metatungstate solution is filtered to remove particles greater than 15 microns in size.

17. The radiation shield of claim 16, wherein:
the ammonium metatungstate solution has a Raman spectra with peaks at approximately 884 $cm^{-1}$, approximately 923 $cm^{-1}$, and approximately 972 $cm^{-1}$.

18. The radiation shield of claim 16, wherein:
the ammonium metatungstate solution comprises greater than 30% tungsten by weight.

19. The radiation shield of claim 16, wherein:
the ammonium metatungstate solution has a gamma ray mass attenuation coefficient of at least 0.06 (square centimeters)/gram.

20. The radiation shield of claim 16, wherein:
the container is a polycarbonate container, which provides an effective barrier to penetration of any alpha particle, beta particle, gamma ray, bremsstrahlung, and other secondary radiation.

* * * * *